United States Patent Office 3,307,954
Patented Mar. 7, 1967

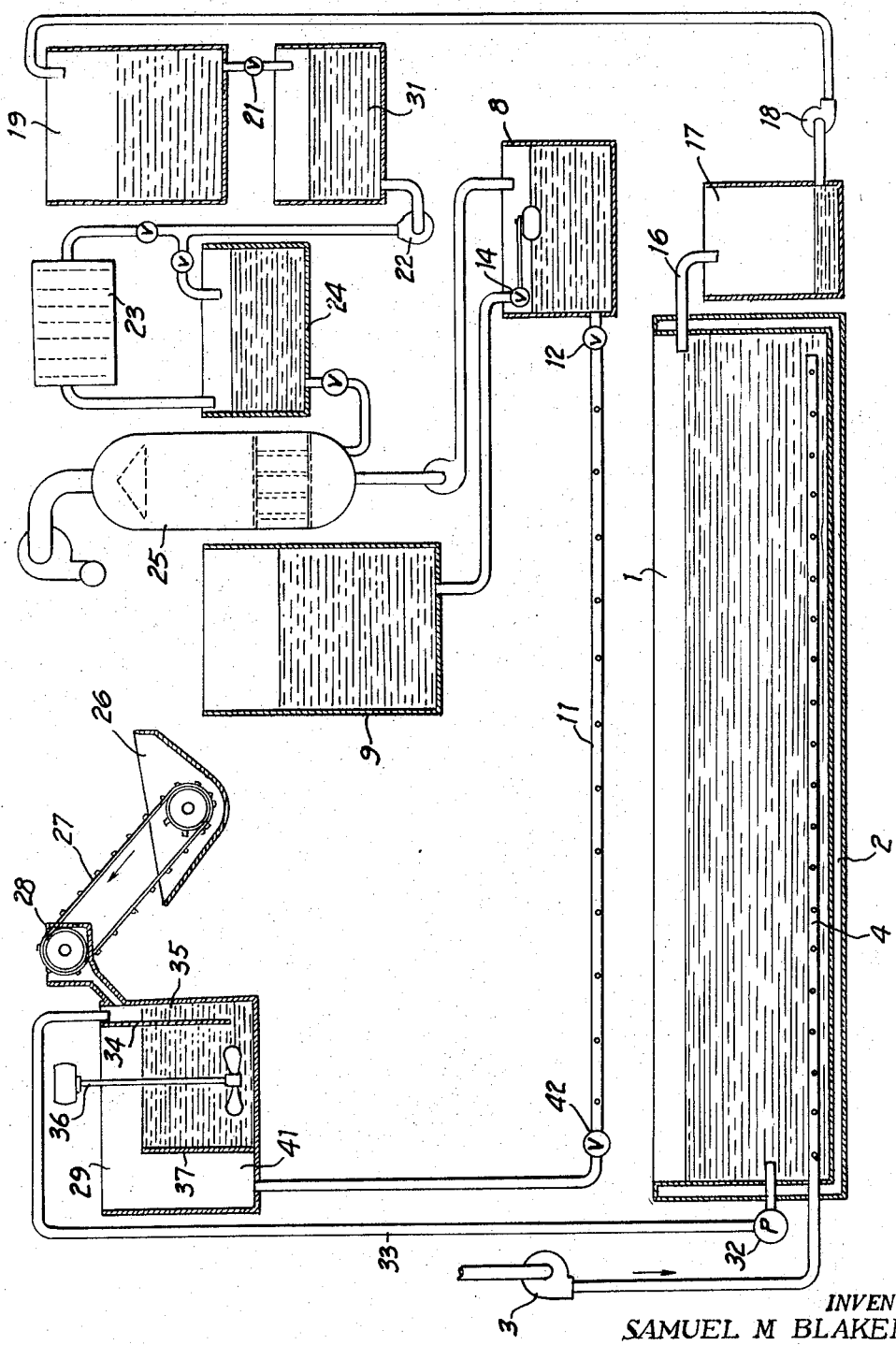

3,307,954
PROCESS FOR PREPARING A BRINED,
SWEETENED FRUIT PRODUCT
Samuel M. Blakemore, 822 Delta Ave.,
Cincinnati, Ohio 45226
Filed Sept. 24, 1962, Ser. No. 225,734
12 Claims. (Cl. 99—102)

This invention relates to a method of and machine for preparing maraschino and glaceed cherries and other fruit products of this type.

For many years, maraschino type and glaceed cherries have been prepared by a process in which fresh cherries are first brined or subjected to a brine including lime and sulphur dioxide in water for a substantial period. In the brining step, cherries are bleached by the sulphur dioxide to a fairly uniform light yellow color. The flesh of cherries contains large amounts of the enzyme pectin esterase which brings about a reaction between the calcium in the brine and the pectin in the cherries. This causes the cherries to become firm and the flesh to be easily separated from the pit so that the brined cherries may be pitted and retain their shape. The cherries shrink uniformly in brine so their shape is not distorted. Thereafter, the pits are removed. The brined and pitted cherries are washed. The washing removes not only sulphur dioxide but also the bleached coloring matter and also much lime or calcium. The removal of sulphur dioxide is necessary and required by law. Removal of the natural coloring matter is also desirable because, if it remains in the cherries through inadequate washing, it can reappear in its colored form when the removal of sulphur dioxide is completed during subsequent processing steps, producing muddy, not bright colors in the finished product. Removal of too much lime or calcium is undesirable as it softens the fruit and results in low yields.

Following washing the cherries are sweetened or syruped. In the sweetening step, the cherries are held in a tank of sugar syrup or the like. To the sweetening or sugar syrup may be added coloring, a preservative, if used, and an acid such as citric acid for flavor in addition to the sweetening agent, which can be sugar, and/or corn syrup or the like. The sweetening step usually takes several days, and sugar or the like must be added periodically so that the concentration of the sweetening solution is maintained. This requires supervision and care at periodic intervals during the sweetening step.

The fundamental problem in the sweetening of cherries or the like is the replacement of the water in the washed cherries with sugar. Sugar going into the cherries occupies space or volume so water must come out of the cherries to make way for the sugar going in.

The cherry cells are held together by calcium pectate produced by the reaction of the normal pectin of the fruit with calcium of the brine. If too much calcium is removed by washing or if insufficient calcium has been used in brining, the cherries are apt to be soft and give low yields of finished products.

An object of this invention is to provide a method of preparing maraschino and glaceed cherries and other sweetened fruit products of this type in which increased yields of sweetened fruit products are obtained.

A further object of this invention is to provide a method of preparing such fruit products in which the time required for the sweetening step is substantially reduced so that labor saving devices and apparatus can satisfactorily be used in connection with the sweetening step.

A further object of this invention is to provide a method of preparing such fruit products in which the loss of calcium during washing is minimized to provide a firm, attractive finished fruit product even where sufficient washing is employed to remove substantially all of the natural fruit coloring matter of the fruit.

I have discovered that, by the addition of a treating or conditioning step following brining, the rate at which sweetening can progress is greatly speeded and the yields of sweetened fruit products can be substantially increased. The brined fruit, preferably after pitting, is drained of brine and submerged in a treating solution containing a water-soluble molecularly dehydrated phosphate such as sodium metaphosphate for a sufficient time to permit the phosphate to diffuse into the fruit and bring about the desired modification of the structure. For best results, an enzyme having a proteolytic action, such as papain, is also added to the treating solution in addition to the metaphosphate. After treatment with such a solution, the fruit is sweetened, but a substantially reduced time is required for the sweetening step and substantially enhanced yields of fruit product are obtained.

In the present practice, it has been usual to restore the sugar concentration of the sweetening solution at fairly regular intervals of time such as three or four times during a working day. In the preparation of maraschino cherries it has been common to requre about a week for the sweetening process whereas for the production of glaceed cherries, approximately two weeks have been required because of the greater sugar content thereof. In the production of maraschino cherries, approximately 15 to 20 additions of sugar are required during the five working days of the week. The additions tend to maintain a more or less constant differential between the concentration of sugars in the syrup and the concentration of sugars inside the cherry cells. If this differential concentration becomes too great, water is drawn from the cells at a greater rate than sugar enters the cells with the result that the cells shrivel and the cherries shrivel. At the correct differential concentration there is a volumetric balance between the volume of water drawn from the cells and the volume of sugar entering the cells by osmosis so that the cells retain their shape and the cherries do not shrivel. If the differential concentration is less than optimum, the cherries do not shrivel but the time required for sweetening is unnecessarily prolonged.

In my process with metaphosphate treated cherries, the short time required for sweetening and the excellent yields indicate that the allowable differential concentration of sugars in the syrup and within the cells is much greater than it is with untreated cherries.

This suggests that the permeability of the cell membranes is actually beneficially modified by the metaphosphate treatment and enzymes.

The short time required for sweetening process with metaphosphate treated cherries, and the increased rate at which the cherries can absorb the sweetening agent without shriveling or other deleterious effects renders additions of sweetening agent at more frequent intervals desirable. The time for preparation of maraschino cherries can be reduced to a single working day in my new process. In this day, additions of sugar or the like are preferably made at frequent intervals or constantly during the sweetening step.

A further object of this invention is to provide a device for constantly adding sweetening agent to the sweetening syrup to accurately maintain the desired differential concentration of sweetening agent.

The above and other objects and features of the invention will be apparent to those skilled in the art to which this invention pertains from the following detailed description, and the drawing.

The drawing is a schematic view partly in section and partly in side elevation of a device for continuous addition of sweetening agent to a fruit treating container constructed in accordance with an embodiment of this invention.

According to my process natural fruit cherries, or other fruits which are preserved and bleached in sulphur dioxide-calcium brines, such as apricots, peaches, strawberries, etc., are brined with a lime brine containing sulphur dioxide. This brining step can follow the present usual practice. A typical brine can consist of a water solution containing one percent to one and a half percent by weight of sulphur dioxide (8.4 to 12.6 pounds per hundred gallons) and 0.6 to 0.9 percent by weight of hydrated lime (5 to 7½ pounds per hundred gallons). The natural fruit is submerged in a tank containing such a solution for a minimum of sixty days and preferably ninety days or longer to cure. In curing, the fruit is bleached by sulphur dioxide, and calcium from the brine reacts with pectin of the fruit to cause the fruit to become firm and to cause the flesh thereof to be easily separated from the pits.

According to usual practice, brined cherries can be removed from the brine and pitted, after which the pitted cherries can be repacked in small barrels with enough of the original brine to fill the barrels. It is common practice to use a small barrel containing 250 pounds of pitted fruit for this purpose.

When the fruit is to be processed, the brine is drained from the fruit and the brine is replaced with a treating solution. The treating solution contains a molecularly dehydrated phosphate. By the term "molecularly dehydrated phosphates," I mean phosphates which may be considered as derived from phosphoric acids poorer in water than orthophosphoric acid. Included among the molecularly dehydrated phosphates are the crystalline pyrophosphates, acid pyrophosphates, tripolyphosphates, and metaphosphates. Also included are the phosphate glasses which can be prepared over a wide range of composition with molar ratios of $M_2O$ to $P_2O_5$ from the value of 0 corresponding to glassy $P_2O_5$ up to the value of about 1.7 approximating the overall composition of tripolyphosphate. The expression $M_2O$ represents total alkalimetal oxide and is intended to represent mixtures of alkalimetal oxides.

The ratio of $M_2O:P_2O_5$ for the molecularly dehydrated phosphates ranges from 0 to 2:1. Glassy phosphates are preferred having a ratio of $M_2O:P_2O_5$ in the range of 0.8:1 to about 1.7:1, because these glasses may be manufactured with less difficulty than those in the lower ratios. Compositions having a ratio of $M_2O:P_2O_5$ within the range of about 0.4:1 to 1:1 are very effective in my process, and this is true of crystalline as well as glassy phosphates within this range.

Among the crystalline metaphosphates which can be used in my process, the water-soluble trimetaphosphates produce the desired effect only after conversion into tripolyphosphate, which may occur under the conditions of pH and temperature during use. The substantially water-insoluble forms known as Maddrell salt or Kurrol salt are satisfactory since they will go into solution naturally under the conditions of use or may be made to do so conveniently by the addition of suitable substances. For example, insoluble crystalline potassium metaphosphate (Kurrol salt) is solubilized by interaction with sodium ion. Insoluble crystalline sodium metaphosphate (Maddrell salt) may likewise be rendered soluble by potassium ion. If a mixture of insoluble alkali-metal metaphosphates is added to the fruit product, a mutual solubilizing action takes place. The insoluble alkali-metal metaphosphates are also solubilized by acid, so that they could be dissolved before adding to the fruit product to be treated.

Where glassy molecularly dehydrated phosphates are employed, not only phosphate glasses containing one or more alkali-metal oxides can be used, but also those in which some of the alkali-metal oxide has been replaced by bivalent metal oxides, such as calcium oxide or magnesium oxide, or by trivalent metal oxides, such as aluminum oxide. The commercial products commonly merchandised under the trade names "Unadjusted Glass Calgon," which I understand is sodium hexametaphosphate having a ratio of $Na_2O:P_2O_5$ of 1:1 and "Calgon," which I understand is sodium metaphosphate having a ratio of $Na_2O:P_2O_5$ of 1:1, together with alkali carbonates, are particularly effective.

I have found that the best results are obtained when the treating solution contains from 8 ounces (½ pound) to 48 ounces (3 pounds) of such a molecularly dehydrated phosphate in sufficient water to cover 250 pounds of pitted fruit. More or less of the phosphate can be used depending upon the need and experience of the processor. The quantity of water required for the treating solution will vary with the container used in the treating step. If the treating is carried on in the cherry barrel itself, approximately 160 pounds of water are required. The treating solution should remain on the fruit long enough for the phosphate to diffuse into the fruit. Approximately one week has been found to be sufficient for brined pitted cherries which are maintained at room temperature. On the other hand, if desired, the fruit and treating solution can be charged into a heated tank, in which case the time of treating can be materially shortened. If the temperature of the treating solution is raised and maintained at approximately 120° F., a period of five to six hours is sufficient for treating brined pitted cherries.

The treating step is even more effective if a small amount of an enzyme having a proteolytic effect is added to the treating solution in addition to the molecularly dehydrated phosphate already described. When a small amount of the commercial proteolytic enzyme known as "papain" such as one-third of an ounce to one ounce thereof, is added to the treating solution used on 250 pounds of cherries in a treating process as already described, enhanced yields of finished cherries of improved characteristics are obtained. Addition of the commercial distatic enzyme known as "diastase" has been found to have a similar effect. Tests have indicated that this commercial product has a proteolytic effect just as papain has.

While treatment with molecularly dehydrated phosphate alone greatly improves the appearance of the brined cherries after washing, treatment with such a phosphate plus an enzyme does an outstanding job. The cherries become plump, blemishes disappear and the flesh becomes almost translucent. This improvement in appearance carries through into the finished product, making it difficult to distinguish dark sweets from light sweets when finished.

After treatment, the cherries can be used within any time up to several weeks and before the effect of the treatment retrogrades. After treatment, the treating solution is removed from the cherries, as by washing the treated cherries with water, and the cherries are sweetened or syruped. The sweetening or syruping can be effected in the usual sweetening or processing equipment. However, the sweetening can proceed much more quickly than has been possible heretofore and larger yields of better appearing fruit are obtained.

The following examples are given to illustrate the invention in greater detail, but it is to be understood that the examples are given primarily by way of example, rather than by way of limitation, except as set forth in the claims.

*Example 1*

Commercially brined Windsor cherries were pitted to obtain a sample of 1,000 grams (drained weight) of brined and pitted Windsor cherries. The sample was covered with a solution of the commercial product known as "Unadjusted Glass Calgon" (which, as already pointed out, I understand is sodium hexametaphosphate having a ratio of $Na_2O:P_2O_5$ of approximately 1:1) and commercial papain. A solution of 6 grams of "Unadjusted Glass Calgon" and 0.25 gram of papain was used in sufficient water to cover the cherries. (This is at a rate of 24 ounces of "Unadjusted Glass Calgon" and 1.0 ounce papain for 250 pounds of drained cherries.) After remaining in the treating solution for sixteen days, the cherries are drained and washed in running tap water for twenty-two hours. The washed cherries weighed 1043 grams. The cherries were removed and sweetened in a laboratory flask in which the washed cherries were submerged in 800 grams of 40° Brix sugar solution at a temperature of 145° F. to which 0.16 gram of red coloring were added. At intervals of one, two, three, and seven and five-twelfths hours after the start of the sweetening, a 100 cc. portion of the solution overlying the cherries was removed, and 155 grams of sugar were added. During sweetening the contents of the flask were agitated by bubbling air therethrough. The contents of the flask were permitted to cool during sweetening and were at a temperature of 109° F. after two hours and reached substantially room temperature at the end of the sweetening period. At the end of this period, the solution covering the cherries tested 44.2° Brix.

The treated and sweetened cherries were allowed to stand overnight and were removed and drained and had a weight of 1206 grams. The finished cherries were of a bright clear color and firm and plump.

*Example 2*

Commercially brined Windsor cherries were pitted to obtain a sample of 1,000 grams (drained weight) of brined and pitted Windsor cherries. The sample was covered with a solution of the commercial product known as "household Calgon" (which, as already pointed out, I understand is sodium metaphosphate having a ratio of $Na_2O:P_2O_5$ of approximately 1:1, together with alkali carbonates) and citric acid. A solution of 6 grams of household Calgon and 1.5 grams of citric acid was used in sufficient water to cover the cherries. This is at a rate of 24 ounces household Calgon and 6 ounces citric acid per 250 pounds of drained cherries. After remaining in the treating solution for five days, the cherries were drained and washed in running tap water for sixteen hours. The cherries were removed and sweetened in a laboratory flask in which the washed cherries were placed with 50 cc. of water, 500 grams of 50° Brix sugar solution, 0.25 gram of red coloring, and 2.125 grams of preservative and sweetened at room temperature. During a first day of sweetening, 75 grams additions of sugar were made at intervals of two, three, four, five and one-half, and seven hours after the start of sweetening. The batch was allowed to stand overnight. On a second day of sweetening, 200 grams of the solution overlying the cherries was removed and boiled to a weight of 100 grams and returned to the flask to start the second day's sweetening. 75 gram additions of sugar were made at intervals of one, two, four and one-fourth, and five and one-fourth hours thereafter. At the end of six and one-fourth hours of the second day of sweetening, 350 grams of the overlying solution were removed and boiled to form 250 grams of solution which were returned to the flask. At the end of seven and one-half hours after the start of this second day's sweetening, the solution covering the cherries tested 50.8° Brix.

The treated and sweetened cherries were allowed to stand overnight and were then removed and drained and had a weight of 1178 grams. The finished cherries were of a bright, clear color and of good quality.

*Example 3*

Commercially brined Windsor cherries were pitted to obtain a sample of a 1,000 grams (drained weight) of brined and pitted Windsor cherries. The sample was covered with a solution of the commercial product known as "Unadjusted Glass Calgon," and commerical diastase. A solution of 6 grams of Unadjusted Glass Calgon and 0.25 gram of diastase was used in sufficient water to cover the cherries. (This is at the rate of 24 ounces of Unadjusted Glass Calgon and 1.0 ounce diastase per 250 pounds of drained cherries). After remaining in the treating solution for fifteen days, the cherries were drained and washed in running tap water for twenty-two hours. The cherries were removed and sweetened in a laboratory flask in which the washed cherries were submerged in 800 grams of 40° Brix sugar solution to which 0.16 gram of red coloring were added. The temperature was maintained between 132° and 145° F. during treatment. At intervals of one, two, three and one-half, and seven and five-twelfths hours following the start of treatment, 100 cc. of the overlying syrup were removed and 155 grams of sugar were added. At the end of this time, the solution covering the cherries tested 44.2 Brix.

The treated and sweetened cherries were allowed to stand overnight and were then removed and drained and had a weight of 1206 grams.

*Example 4*

Commercially brined Windsor cherries were pitted to obtain a sample of a 1,000 grams (drained weight) of brined and pitted Windsor cherries. The sample was covered with a solution of the commercial product known as "Unadjusted Glass Calgon" and commercial papain. A solution of 4 grams of Unadjusted Glass Calgon and 0.2 gram of papain was used in sufficient water to cover the cherries. This is at a rate of 16 ounces of Unadjusted Glass Calgon and 0.8 ounce papain per 250 pounds of drained cherries.) After remaining the treating solution for ten days, the cherries were drained and washed in running tap water for twenty-three hours. The cherries were removed and sweetened in a laboratory flask in which the washed cherries were submerged in 640 cc. of water to which 8.6 cc. of green coloring were added. Glace syrup consisting of equal weights of corn syrup and 80° Brix sugar solution, the mixture testing 80° Brix, was added continuously at a rate to add 900 grams of solution during the first day of sweetening. During addition of solution, the contents of the flask were agitated with air. At the end of the first day 498 grams of dilute solution were removed and boiled down to an 80% by weight sugar solids solution, which solution was returned to the flask on the second day in continuous solution adding apparatus. Sweetening was continued for a third, fourth, and fifth day, dilute syrup being removed as additional syrup was added and being boiled down to 80% solids content. The flask was maintained at a temperature of 110° to 120° F. during sweetening. At the end of five days of sweetening, the solution covering the cherries tested 76.8° Brix.

The treated and sweetened cherries were removed and drained and had a weight of 1241 grams candied or glaceed cherries.

*Example 5*

Commercially brined Napoleon cherries were pitted to obtain a sample of 1,000 grams (drained weight) of brined and pitted Napoleon cherries. The sample was covered with a solution of the commercial product known as "Unadjusted Glass Calgon" and commercial papain. A solution of 6 grams of Unadjusted Glass Calgon and 0.125 gram of papain was used in sufficient water to cover the cherries. (This is at a rate of 24 ounces Unadjusted Glass Calgon and 0.5 ounce papain for 250 pounds of drained cherries.) After remaining in the treating solution for five and one-half hours at a temperature of 120° F., the cherries were drained and washed in running tap water for seventeen hours. The cherries were removed and sweetened in a laboratory flask in which the washed cherries were submerged in 755 grams of 40° Brix sugar syrup to which 10 cc. of green coloring solution weere added. The solution was maintained at a temperature of 117° to 120° F. during sweetening. During the first day of sweetening, at intervals of one, two, six, seven, and eight hours after the start of the sweetening, 50 cc. of solution were removed and 77½ grams of sugar were added. The contents of the flask were permitted to stand overnight. On a second day of sweetening, similar removals of the solution and additions of sugar were made at the start and at intervals of one and two hours thereafter. At the end of three days thereafter, the solution covering the cherries tested 43.1° Brix.

The treated and sweetened cherries were allowed to stand three days, at the end of which time the cherries were colored uniformly. The cherries were drained and had a weight of 1206 grams. The finished cherries were of a bright clear nature.

In the regular commercial process the greatest yields and best quality have been obtained in five days, i.e., a seven day tank cycle for maraschinos and ten days, i.e., a 14 day tank cycle for glaceed cherries. In my process cherries treated with a molecularly dehydrated phosphate and an enzyme have been processed as maraschinos in as short a time as five hours for sweetening, i.e., a one day tank cycle and as glaceed cherries in as short a time as five days, i.e., a seven day tank cycle, with better yields and quality.

In the regular commercial process it has been found that the temperature is limited by an adverse effect on yields and quality. It is usually necessary to raise the temperature to 145° F. at least once per day to inhibit fermentation, otherwise a temperature of about 120° F. is preferable for better quality. The same temperature considerations govern my process for cherries treated with a molecularly dehydrated phosphate.

In the regular commercial process dry granulated sugar is sometimes used for maraschinos. Usually, however, for both maraschinos and glaceed cherries the sweetening agent is sugar syrup, invert sugar syrup and/or corn syrup, testing about 80° Brix. I use the same ingredients in my process.

In the regular commercial process the sweetening ingredient is added at fairly regular intervals two or three times during the working day. The additions tend to maintain a more or less constant differential between the concentration of sugars in the syrup and the concentration of sugars inside the cherry cells.

In my process, the time required for sweetening maraschino cherries is as little as one-fifth the time ordinarily required. I have developed the apparatus shown in the attached drawings for continous sweetening of the cherries so that the amount of supervision required during sweetening or syruping is minimized and the preferred differential of sweetness between fruit and syrup is maintained throughout the sweetening. In the drawing, a tank 1 is shown which is provided with a hot water jacket 2. The tank 1 can be charged with a batch of cherries (not shown), and the cherries can be submerged in a sugar syrup of appropriate concentration, for example 36° Brix. Coloring for the fruit is added to the tank in accordance with usual practice.

Agitation of the batch is provided by a blower 3 which blows air through openings in a submerged perforated pipe 4. Bubbles of air rising through the syrup keep it in continuous agitation.

Heavy syrup having a specific gravtiy of, for example 80° Brix from a holding tank 8 is distributed over the surface of the syrup in the tank through a perforated pipe 11. A valve 12 controls the rate of flow of the syrup from the tank 8. The tank 8, in turn, is filled from a central syrup reservoir 9. A float operated valve 14 controls flow of syrup from the reservoir 9 so that the level in the tank 8 is maintained.

The heavy syrup is added to the sweetening tank continuously and at such a rate as to maintain an optimum differential concentration of soluble solids between the syrup surrounding the cherries and the syrup which has been absorbed by the cherry cells. At the ordinary temperatures maintained in sweetening tanks of 120–145° F. and with the active air agitation maintained in this particular apparatus considerable evaporation of water takes place from the tank. However, in the short time required for sweetening with molecularly dehydrated phosphate treated cherries, the amount of water which will be evaporated is far short of the amount required to prevent accumulation of syrup.

Dilute syrup from the sweetening tank is withdrawn through the overflow line 16 to be received in a surge tank 17. A pump 18 pumps dilute syrup from the surge tank 17 to a dilute storage tank 19. Appropriate control mechanism can be associated with the pump 18 and the surge tank 17 so that the pump can be intermittently operated to discharge contents of the surge tank into the dilute syrup storage tank 19.

Periodically, a batch of the dilute syrup in the dilute syrup tank 19 is released through a valve 21 to a mixing tank 31 where decolorizing carbon is added. The pH can be adjusted with hydrated lime, if desired, and a filter aid can be added in accordance with the usual practice in clarifying sugar syrups. Treated dilute syrup is pumped by a pump 22 through a filter press 23 into a clear well 24. From the clear well the dilute syrup is fed into a vacuum pan 25 and concentrated to form a heavy syrup having a concentration, for example of 80° Brix. The heavy syrup is pumped into heavy syrup holding tank 8. From here the syrup cycle is repeated.

If it is desired to use dry sugar as the sweetening agent instead of separately prepared sugar syrup, the apparatus in the upper left-hand portion of the drawing is utilized. Sugar from a hopper 26 is raised by an elevator 27 to a trough 28 which discharges the sugar into a dissolving tank 29. Dilute syrup from the treating tank 1 is pumped by a pump 32 through a line 33 into the dissolving tank 29. A baffle 34 separates a section 35 of the dissolving tank 29 from the remainder thereof. In this section the dilute syrup and the sugar are introduced. An appropriate agitating device 36 in the dissolving tank expedites solution of the sugar in the dilute syrup. A low wall 37 in the dissolving tank provides a barrier over which heavy syrup in the dissolving tank overflows into a discharge section 41, heavy syrup flows to the pipe 11 under control of a valve 42.

Even using dry sugar as the sweetening agent evaporation of water from sweetening tank 1 will not be sufficient to prevent accumulation of excess syrup. The excess dilute syrup formed in the tank will be continuously removed through overflow line 16 into the syrup reclaiming and concentrating cycle, as described above.

By selecting equipment of the right size, this apparatus can be operated 24 hours per day, and may be made completely automatic. Or, the sweetening process may be set up to operate automatically 24 hours per day while the syrup refining and concentrating cycle may be operated 8 hours per day.

Having described my invention, what I claim as new and desire to secure by Letters Patent is:

1. In a process of preparing a brined, sweetened cherry product from brined cherries, the steps of subjecting brined cherries to an aqueous treating solution consisting essentially of water and a molecularly dehydrated phosphate for a time sufficient to permit the phosphate to diffuse into the cherries, and sweetening the cherries to form a brined, sweetened cherry product of improved appearance.

2. In a process of preparing a brined, sweetened fruit product from brined fruit, of subjecting brined fruit to an aqueous treating solution consisting essentially of water and a molecularly dehydrated phosphate for a time sufficient to permit the phosphate to diffuse into the fruit, and sweenening the brined and treated fruit to form a brined, sweetened fruit product of improved appearance.

3. In a process of preparing a brined, sweetened cherry product from brined cherries, the steps of subjecting brined cherries to an aqueous treating solution consisting essentially of water and a molecularly dehydrated phosphate for a time sufficient to permit the phosphate to diffuse into the cherries, and sweetening the brined and treated cherries to form a brined, sweetened cherry product of improved appearance.

4. In a process of preparing a brined, sweetened cherry product from brined cherries, the steps of subjecting brined cherries to an aqueous treating solution consisting essentially of water, a molecularly dehydrated phosphate, and an enzyme having a proteolytic effect for a time sufficient to permit the phosphate and enzyme to diffuse into the cherries, and sweetening the brined and treated cherries to form a brined, sweetened cherry product of improved appearance.

5. In a process of preparing a brined, sweetened fruit product from brined fruit, the steps of subjecting the brined fruit to an aqueous treating solution consisting essentially of water and a molecularly dehydrated phosphate for a time sufficient to permit the phosphate to diffuse into the fruit, removing the treating solution, and sweetening the brined and treated fruit to form a brined, sweetened fruit product of improved appearance.

6. In a process of preparing a brined, sweetened fruit product from a brined fruit, the steps of subjecting the brined fruit to an aqueous treating solution consisting essentially of water, a molecularly dehydrated phosphate, and an enzyme having a proteolytic effect for a time sufficient to permit the phosphate and enzyme to diffuse into the fruit, and sweetening the brined and treated fruit to form a brined, sweetened fruit product of improved appearance.

7. In a process of preparing a brined, sweetened cherry product from brined cherries, the steps of subjecting brined cherries to an aqueous treating solution consisting essentially of water and a molecularly dehydrated phosphate for a time sufficient to permit the phosphate to diffuse into the cherries, removing the treating solution, and sweetening the brined and treated cherries to form a brined, sweetened cherry product of improved appearance.

8. In a process of preparing a brined, sweetened cherry product from brined cherries, the steps of subjecting brined cherries to an aqueous treating solution consisting essentially of water, a molecularly dehydrated phosphate, and an enzyme having a proteolytic effect for a time sufficient to permit the phosphate and enzyme to diffuse into the cherries, removing the treating solution, and sweetening the brined and treated cherries to form a brined, sweetened cherry product of improved appearance.

9. In a process of preparing a brined, sweetened fruit product from a brined fruit, the steps of subjecting the brined fruit to an aqueous treating solution consisting essentially of water, a molecularly dehydrated phosphate, and an enzyme having a proteolytic effect, there being approximately 1 to 6 parts of the molecularly dehydrated phosphate to 500 parts of the fruit for a time sufficient to permit the phosphate and enzyme to diffuse into the fruit, and sweetening the brined and treated fruit to form a brined, sweetened fruit product of improved appearance.

10. In a process of preparing a brined, sweetened cherry product from brined cherries, the steps of subjecting brined cherries to an aqueous treating solution consisting essentially of water and a molecularly dehydrated phosphate, there being approximately 1 to 6 parts by weight of molecularly dehydrated phosphate to 500 parts of cherries for a time sufficient to permit the phosphate to diffuse into the cherries, removing the treating solution and sweetening the brined and treated cherries to form a brined, sweetened cherry product of improved appearance.

11. In a process of preparing a brined sweetened fruit product from brined fruit, the steps of subjecting brined fruit to an aqueous treating solution consisting essentially of water and a molecularly dehydrated phosphate, there being approximately 1 to 6 parts by weight of molecularly dehydrated phosphate to 500 parts of brined fruit for a time sufficient to permit the phosphate to diffuse into the fruit, removing the treating solution and sweetening the brined and treated fruit to form a brined, sweetened fruit product of improved appearance.

12. In a process of preparing a brined sweetened fruit product from brined fruit, the steps of subjecting brined fruit to an aqueous treating solution consisting essentially of water and a molecularly dehydrated phosphate, there being approximately 3 parts by weight of molecularly dehydrated phosphate to 500 parts of brined fruit for a time sufficient to permit the phosphate to diffuse into the fruit, removing the treating solution and sweetening the brined and treated fruit to form a brined, sweetened fruit product of improved appearance.

References Cited by the Examiner

UNITED STATES PATENTS

| | | | |
|---|---|---|---|
| 1,006,992 | 10/1911 | Wiener | 99—228 X |
| 1,666,551 | 4/1928 | Butler et al. | 99—156 |
| 1,703,730 | 2/1929 | Fraisse | 99—102 |
| 1,774,310 | 8/1930 | Bates | 99—156 |
| 1,890,475 | 12/1932 | Todd | 99—102 |
| 1,935,599 | 11/1933 | Rippey | 99—156 |
| 1,956,515 | 4/1934 | Hall | 99—103 |
| 2,188,192 | 1/1940 | Scholler et al. | 195—95 X |
| 2,785,071 | 3/1957 | Mathews | 99—102 |

A. LOUIS MONACELL, *Primary Examiner.*

R. AULL, *Assistant Examiner.*

UNITED STATES PATENT OFFICE
CERTIFICATE OF CORRECTION

Patent No. 3,307,954 March 7, 1967

Samuel M. Blakemore

It is hereby certified that error appears in the above numbered patent requiring correction and that the said Letters Patent should read as corrected below.

Column 8, line 68, after "fruit," insert -- the steps --; line 72, for "sweenening" read -- sweetening --.

Signed and sealed this 7th day of November 1967.

(SEAL)
Attest:

Edward M. Fletcher, Jr.
Attesting Officer

EDWARD J. BRENNER
Commissioner of Patents